(12) United States Patent
Takeuchi et al.

(10) Patent No.: US 10,591,189 B2
(45) Date of Patent: Mar. 17, 2020

(54) ADSORPTION CORE AND MANUFACTURING METHOD THEREOF

(71) Applicant: DENSO CORPORATION, Kariya, Aichi-pref. (JP)

(72) Inventors: Shinsuke Takeuchi, Kariya (JP); Akira Yanagida, Kariya (JP); Yoshiyuki Okamoto, Kariya (JP); Hisao Nagashima, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 233 days.

(21) Appl. No.: 15/039,069

(22) PCT Filed: Nov. 28, 2014

(86) PCT No.: PCT/JP2014/005954
§ 371 (c)(1),
(2) Date: May 25, 2016

(87) PCT Pub. No.: WO2015/079704
PCT Pub. Date: Jun. 4, 2015

(65) Prior Publication Data
US 2017/0038101 A1 Feb. 9, 2017

(30) Foreign Application Priority Data
Nov. 29, 2013 (JP) .................. 2013-247709

(51) Int. Cl.
*F25B 17/08* (2006.01)
*F28D 20/00* (2006.01)
*F25B 37/00* (2006.01)

(52) U.S. Cl.
CPC .............. *F25B 17/08* (2013.01); *F25B 37/00* (2013.01); *F28D 20/00* (2013.01); *F28D 20/003* (2013.01); *Y02A 30/277* (2018.01); *Y02A 30/278* (2018.01); *Y02B 30/62* (2013.01); *Y02B 30/64* (2013.01); *Y02E 60/142* (2013.01)

(58) Field of Classification Search
CPC .............................. F25B 37/00; F28D 20/003
See application file for complete search history.

(56) References Cited

U.S. PATENT DOCUMENTS

2008/0078532 A1    4/2008   Nagashima et al.

FOREIGN PATENT DOCUMENTS

| JP | 2005111425 A | 4/2005 |
| JP | 2008107075 A | 5/2008 |
| JP | 2011196661 A | 10/2011 |

*Primary Examiner* — Christopher R Zerphey
(74) *Attorney, Agent, or Firm* — Harness, Dickey & Pierce, P.L.C.

(57) ABSTRACT

An adsorption core has (i) a heat medium tube in which a heat medium flows and (ii) an adsorption agent that adsorbs a fluid in a vapor phase outside of the heat medium tube when being cooled by the heat medium and desorbs the absorbed fluid when being heated. The heat medium tube has (i) a core member that is made of metal having a higher hardness with respect to copper and (ii) a covering layer that is made of copper and covers an outer surface of the core member. A sintered body of a copper powder and the adsorption agent is provided in a peripheral portion of the heat medium tube. The copper powder and the heat medium tube are metallically coupled with each other. Accordingly, stiffness of the heat medium tube can be higher while improving a heat transfer performance between the heat medium tube and the adsorption agent.

3 Claims, 6 Drawing Sheets

HEAT MEDIUM

HEAT MEDIUM →

FIG. 7

HEAT MEDIUM →

ADSORPTION CORE AND MANUFACTURING METHOD THEREOF

CROSS REFERENCE TO RELATED APPLICATIONS

This application is a U.S. National Phase Application under 35 U.S.C. 371 of International Application No. PCT/JP2014/005954 filed on Nov. 28, 2014 and published in Japanese as WO 2015/079704 A1 on Jun. 4, 2015. This application is based on and claims the benefit of priority from Japanese Patent Application No. 2013-247709 filed on Nov. 29, 2013. The entire disclosures of all of the above applications are incorporated herein by reference.

TECHNICAL FIELD

The present disclosure relates to an adsorption core that has an adsorption agent adsorbing and desorbing a fluid and relates to a manufacturing method thereof.

BACKGROUND ART

Conventionally, it is disclosed that an adsorption core used for an adsorption-type refrigerator has heat medium tubes in which heat medium flows, and a porous heat-transfer body of metallic powder and an adsorption agent is provided in a peripheral portion of the heat medium tubes (for example, refer Patent Literature 1). In the adsorption core, the metallic powder is metallically coupled with the heat medium tubes.

PRIOR ART LITERATURES

Patent Literature

Patent Literature 1: JP 2008-107075 A

SUMMARY OF INVENTION

According to studies by the inventors of the present disclosure, copper powder that is able to be mixed and sintered at low cost and has high thermal conductivity may be used for the adsorption core having a configuration described in Patent Literature 1. In this case, the heat medium tubes are required to be made of copper since the heat medium tubes are coupled with copper metallically.

However, in a case where the heat medium tubes are made of copper, the heat medium tubes may have a low tolerance for vibration and may be hard to treat because copper becomes soft when being sintered, and stiffness of the heat medium tubes decreases. Therefore, it may be difficult to increase a size and a length of the adsorption core.

The present disclosure addresses the above issues, and it is an objective of the present disclosure to provide an adsorption core, with which stiffness of a heat medium tube can be high while improving a heat transfer performance between the heat medium tube and an adsorption agent, and a manufacturing method of the adsorption core.

According to a first aspect of the present disclosure, an adsorption core has (i) a heat medium tube in which a heat medium flows and (ii) an adsorption agent that adsorbs a fluid in a vapor phase outside of the heat medium tube when being cooled by the heat medium and desorbs the absorbed fluid when being heated. The heat medium tube has (i) a core member that is made of metal having a higher hardness with respect to copper and (ii) a covering layer that is made of copper and covers an outer surface of the core member. A sintered body of a copper powder and the adsorption agent is provided in a peripheral portion of the heat medium tube. The copper powder and the heat medium tube are metallically coupled with each other.

Accordingly, stiffness of the heat medium tube can be improved by configuring the core member of the heat medium tube by metal that has higher hardness with respect to copper.

Furthermore, by providing the sintered body of the copper powder and the adsorption agent in the peripheral portion of the heat medium, the heat transfer performance between the heat medium tube and the adsorption agent can be improved since the copper powder having high thermal conductivity is used as a heat transfer agent between the heat medium tube and the adsorption agent.

In addition, the copper powder can be metallically coupled with the covering layer by providing the covering layer made of copper on the outer surface of the core member of the heat medium tube and by metallically coupling the copper powder and the heat medium tube. Accordingly, thermal resistance of an interface between the sintered body and the heat medium tube can be reduced dramatically, and heat transfer performance between the heat transfer medium and the adsorption agent can be improved certainly.

As described above, stiffness of the heat medium tube can be high while improving heat transfer performance between the heat medium tube and the adsorption agent.

A second aspect of the present disclosure relates to a manufacturing method of an adsorption core that has (i) a heat medium tube in which a heat medium flows and (ii) an adsorption agent that adsorbs a fluid in a vapor phase outside of the heat medium tube when being cooled by the heat medium and desorbs the absorbed fluid when being heated. The manufacturing method includes (i) coating an outer surface of the heat medium tube that has a core member made of metal having a higher hardness with respect to copper to form a covering layer made of copper by copper plating and (ii) sintering a copper powder and the adsorption agent to a peripheral portion of the heat medium tube after the coating. The copper powder and the heat medium tube are metallically coupled with each other in the sintering.

Accordingly, stiffness of the heat medium tube can be improved by using the heat medium tube that has the core member made of metal having higher hardness with respect to copper.

Furthermore, the copper powder having high thermal conductivity can be used as a heat transfer agent between the heat medium tube and the adsorption agent since the sintering the copper powder and the adsorption agent to the peripheral portion of the heat medium tube is included. Accordingly, the heat transfer performance between the heat medium tube and the adsorption agent can be improved.

In addition, the copper powder can be metallically coupled with the covering layer made of copper by metallically coupling the copper powder and the heat medium tube in the sintering. Accordingly, thermal resistance of an interface between the sintered body and the heat medium tube can be reduced dramatically, and heat transfer performance between the heat transfer medium and the adsorption agent can be improved certainly.

As described above, an adsorption core with which stiffness of the heat medium tube can be higher while improving a heat transfer performance between the heat medium tube and the adsorption agent can be provided.

In the present disclosure, "copper" contains both pure copper and a copper alloy.

DESCRIPTION OF EMBODIMENTS

Embodiments of the present disclosure will be described hereafter referring to drawings. In the embodiments, a part that corresponds to a matter described in a preceding embodiment may be assigned with the same reference number, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

First Embodiment

Figure 1:
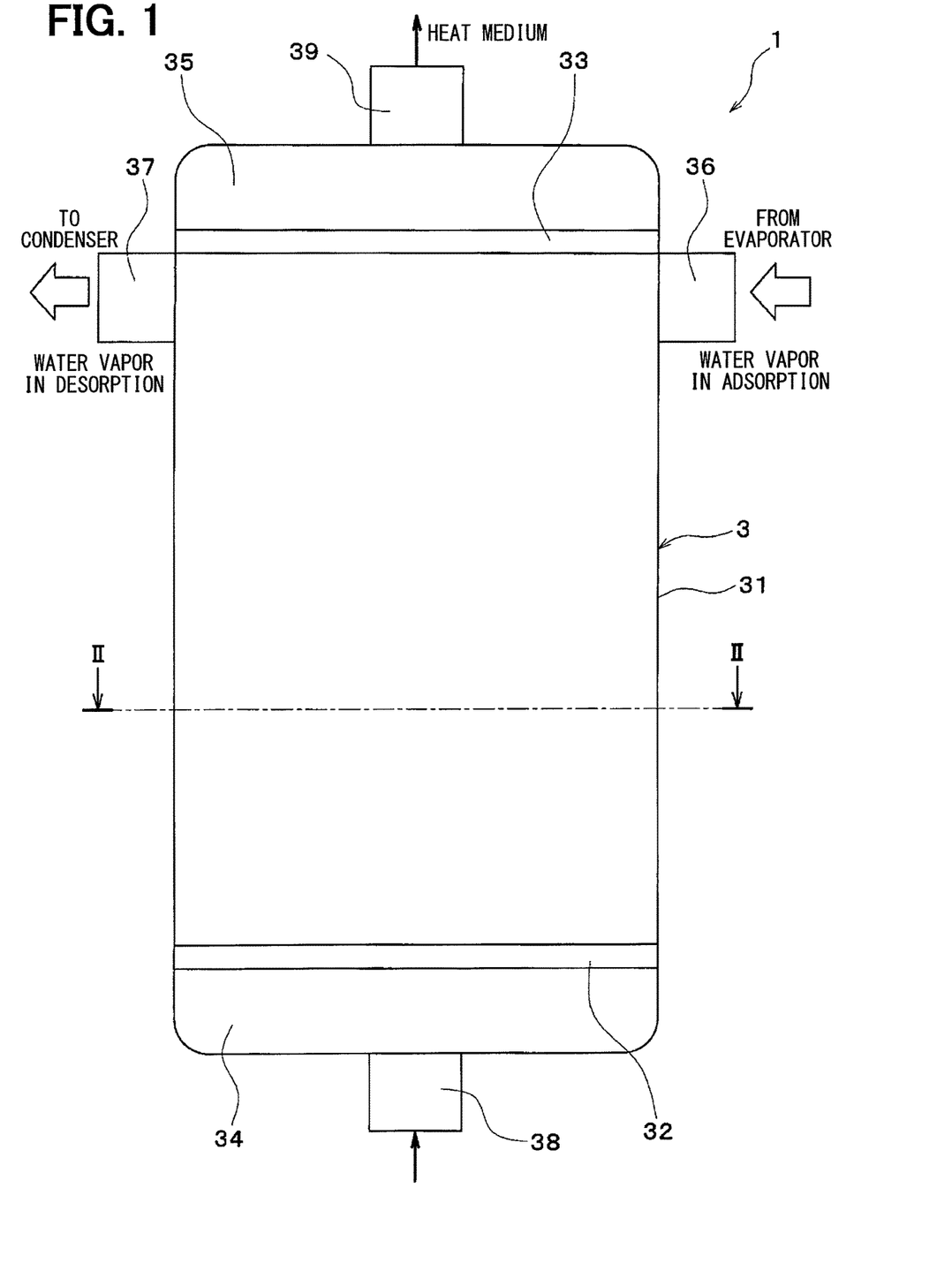
FIG. 1 is as front diagram illustrating an adsorption device according to a first embodiment.

An absorption device having an absorption core according to a first embodiment of the present disclosure will be described referring to FIG. 1 through FIG. 6. As shown in FIG. 1, an absorption device 1 of the present embodiment is mounted in an absorption-type refrigerator that evaporates a fluid in vapor phase (i.e., water vapor in the present embodiment) by using an effect that an absorption agent included therein absorbs the fluid in vapor phase to exert a refrigeration performance by evaporative latent heat. The adsorption device 1 can be used for an air conditioner, for example, for a vehicle.

Figure 2:
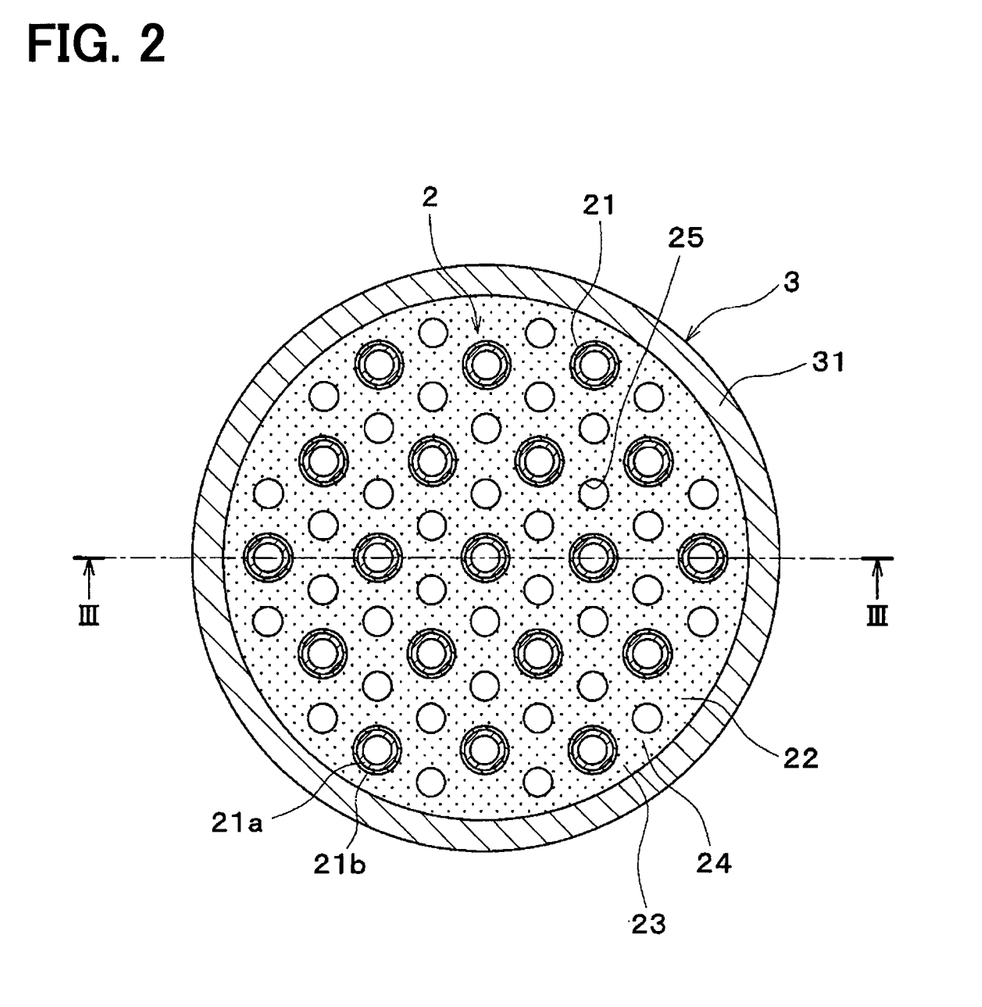
FIG. 2 is a cross-sectional view taken along a line II-II of FIG. 1.
Figure 3:
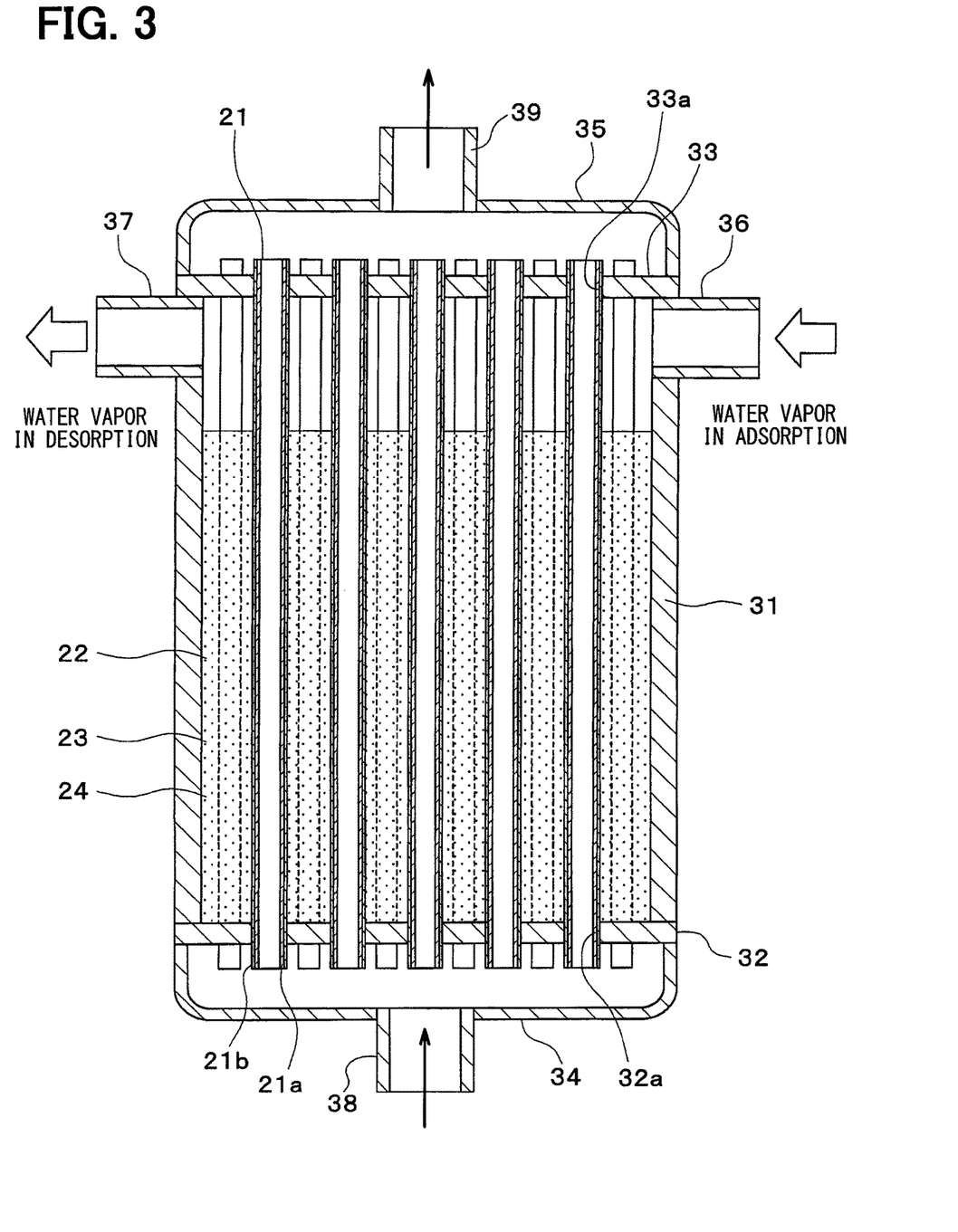
FIG. 3 is a cross-sectional view taken along a line III-III of FIG. 2.

As shown in FIG. 2 and FIG. 3, the adsorption device 1 has an adsorption core 2 in a housing 3. The adsorption core 2 has a heat medium tube 21 in which a heat medium (e.g., refrigerant) flows, and a porous heat transfer agent 23 having pores and an adsorption agent 24 are provided in a peripheral portion 22 of the heat medium tube 21.

Figure 4:
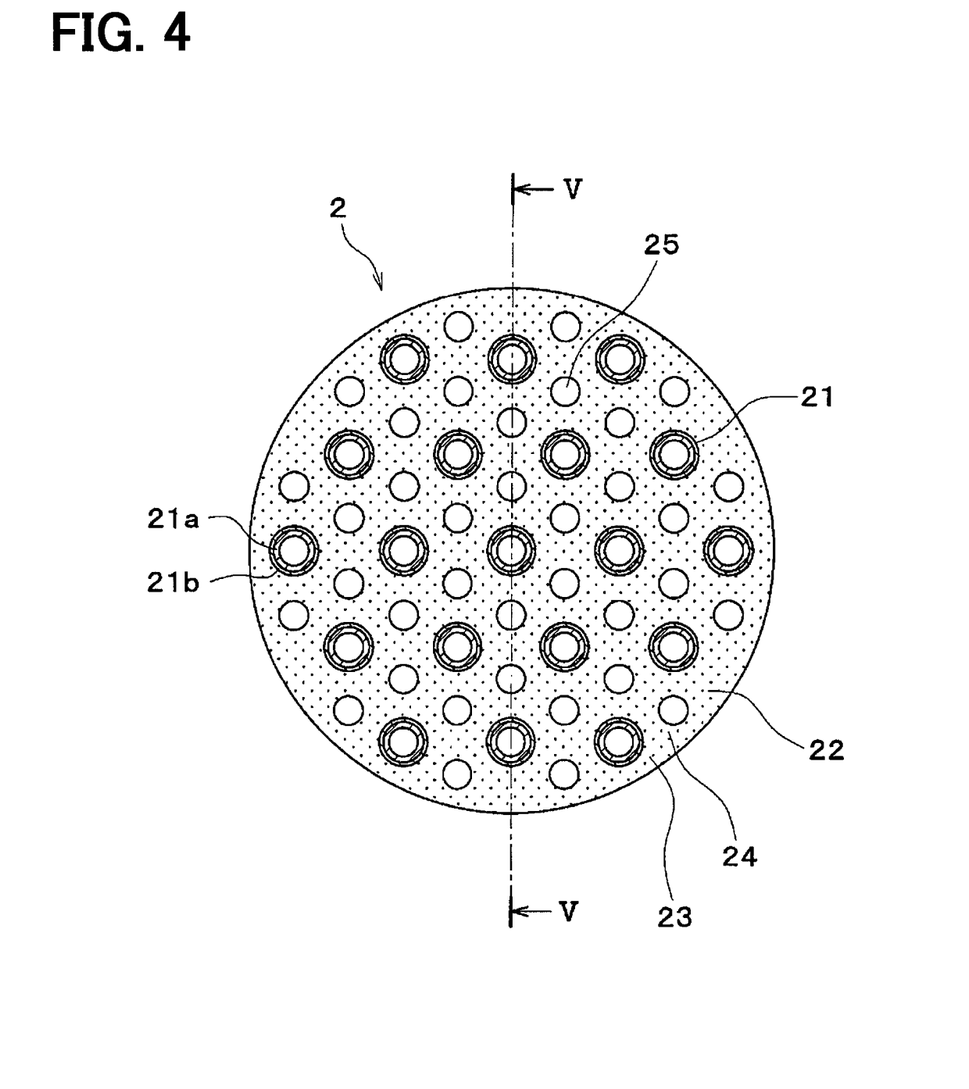
FIG. 4 is a cross-sectional view illustrating an adsorption core according to the first embodiment.
Figure 5:
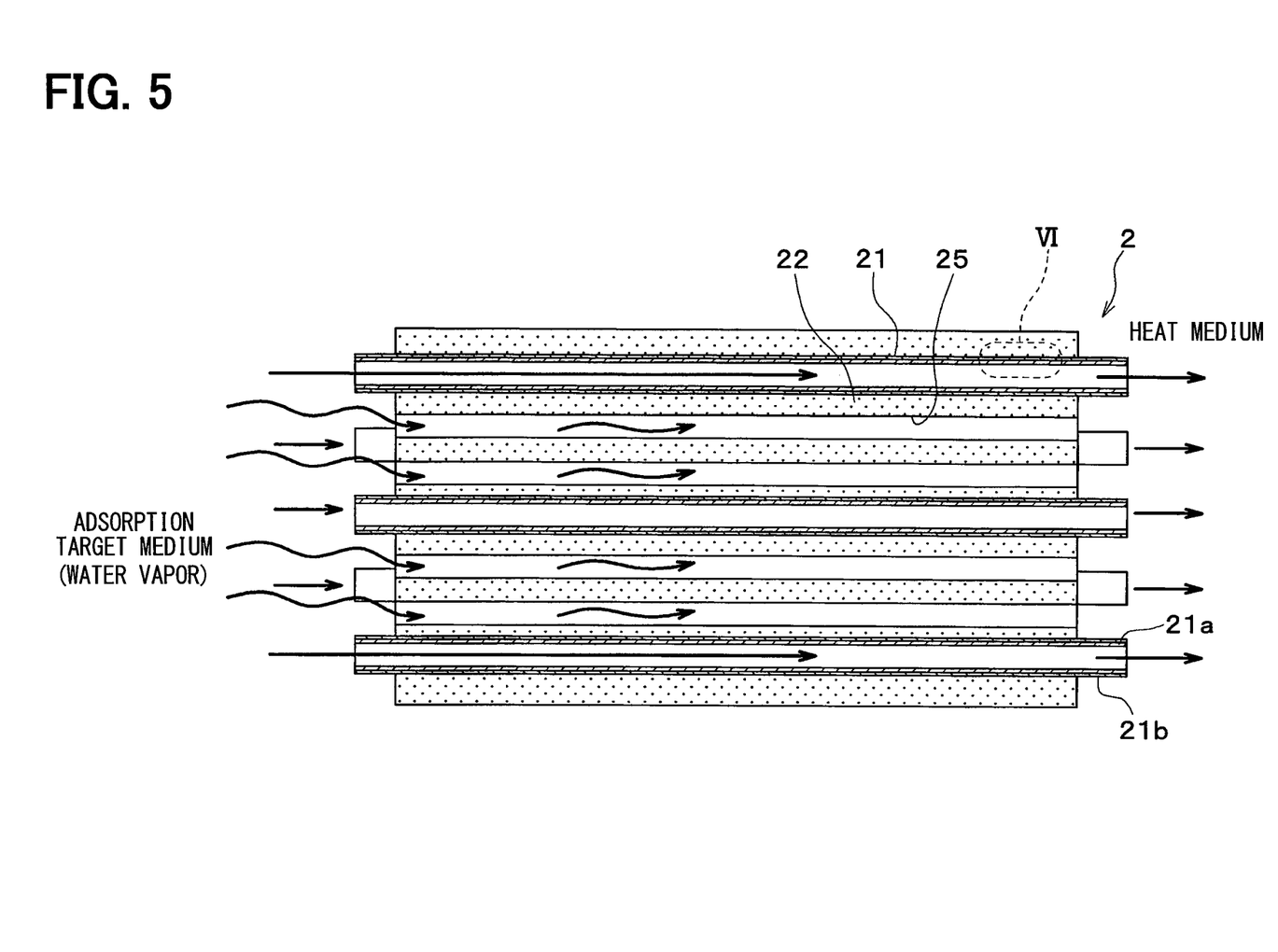
FIG. 5 is a cross-sectional view taken along a line V-V of FIG. 4.
Figure 6:
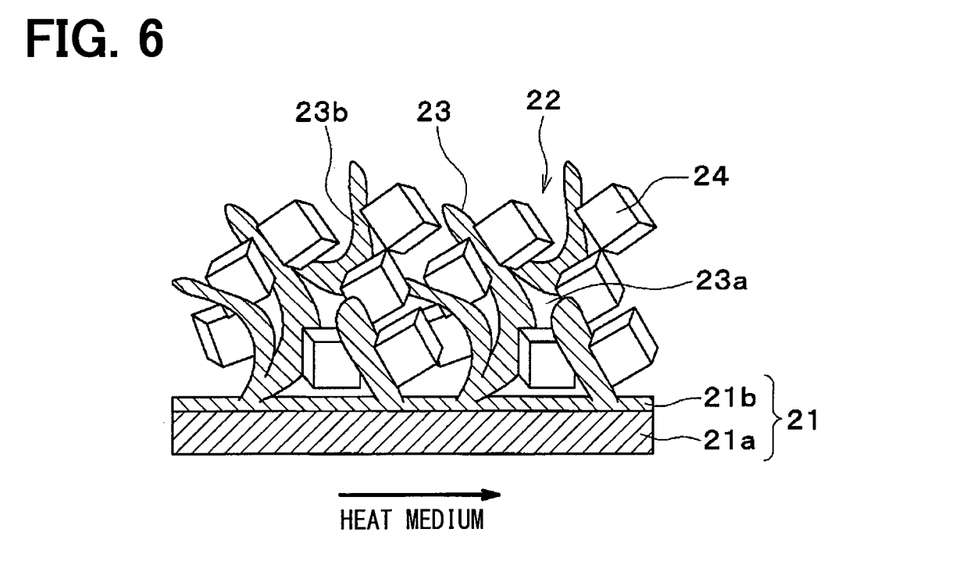
FIG. 6 is an enlarged view illustrating a portion VI of FIG. 5.

Specifically, as shown in FIG. 4, FIG. 5, and FIG. 6, the adsorption core 2 has the heat medium tube 21, the porous heat transfer agent 23 having pores 23a, and the adsorption agent 24 filling the pores 23a.

As shown in FIG. 6, the heat medium tube 21 has (i) a core member 21a that is made of metal (i.e., stainless in the present embodiment) having greater hardness with respect to copper and (ii) a covering layer 21b that is made of copper or a copper alloy (i.e., copper in the present embodiment) and covers an outer surface of the core member 21a. The covering layer 21b is formed by treating copper plating on the outer surface of the core member 21a.

The porous heat transfer agent 23 is a sintered body that is coupled by sintering without being melted in a manner of heating copper powder 23b having a great thermal conductivity. Copper or a copper alloy (i.e., copper in the present embodiment) is used for the copper powder 23b. For example, the copper powder 23b is formed in a powder state, a particle state, a scale state, or a fibrous state (i.e., the fibrous state in the present embodiment).

In the sintering, a so-called three-dimensional network cavity is formed in the sintered body by voids between particles of the copper powder 23b. The three-dimensional network cavity corresponds to the above-described pores 23a. "Coupling by sintering without being melted" described above means welding a portion around a surface layer of the copper powder 23b. That is, in the sintering, the voids (i.e., pores) between particles of the copper powder 23b are remained, and the particles of the copper powders 23b in contact with each other are metallically coupled.

The pores 23a are fine pores that are configured to be capable of being filled with the adsorption agent 24 having a micro particle diameter. The copper powder 23b (i.e., the porous heat transfer agent 23) is metallically coupled with the covering layer 21b of the heat medium tube 21 by sintering. The porous heat transfer agent 23 is formed in the peripheral portion 22 of the heat medium tubes 21 having a cylindrical shape such that an entirety of the porous heat transfer agent 23 extends in one direction. As shown in FIG. 4, the porous heat transfer agent 23 has a cylindrical shape as a whole.

Return to FIG. 6, the adsorption agent 24 adsorbs the fluid in vapor phase (i.e., water vapor) outside of the heat medium tube 21 by being cooled by the heat medium, and desorbs the absorbed fluid (i.e., water vapor) by being heated. The adsorption agent 24 is formed as micro particles and configured by, for example, silica gel or zeolite. The adsorption agent 24 fills an inside of the pores 23a of the porous heat transfer agent 23.

Furthermore, according to the present embodiment, as shown in FIG. 4 and FIG. 5, an adsorption target medium passage 25 in which an adsorption target medium (that will be referred to as water vapor hereafter) flows is arranged between the heat medium tubes 21. The adsorption target medium passage 25 is formed to extend straight in one direction in contrast to the pores 23a providing the above-described three-dimensional network shape. Specifically, the adsorption target medium passage 25 is formed to extend in an extensional direction of the heat medium tube 21, in other words, an axial direction of the heat medium tube 21 having the cylindrical shape.

The adsorption device 1 in which the adsorption core 2 having the above-described configuration is formed integrally in the housing 3 will be described referring to FIG. 1 through FIG. 3.

The adsorption device 1 has the adsorption core 2 and the housing 3 made of metal. According to the present embodiment, the housing 3 is configured by copper or a copper alloy. The housing 3 has a housing body 31, seats 32, 33, and tanks 34, 35.

The housing body 31 is formed in a cylindrical shape and formed to be capable of therein housing the porous heat transfer agent 23 of the adsorption core 2 having the cylindrical shape. An opening of an upper end side and an opening of a lower end side of the housing body 31 are formed to be capable of being sealed by the seats 32, 33 respectively. An adsorption target medium inflow pipe 36 and an adsorption target medium outflow pipe 37 that are capable of guiding water vapor to a portion (i.e., an adsorption agent packed bed) of the adsorption core 2 that is filled with the adsorption agent are provided in an upper portion of the housing body 31.

An inside of the housing 3 can be retained in a condition of being evacuated by sealing the housing body 31 and the seats 32, 33 as described above. Accordingly, another vapor other than water vapor that is the adsorption target medium is not contained in an inner enclosed space that is formed by the housing body 31 and the seats 32, 33.

In the adsorption, water vapor is distributed to the adsorption target medium passage 25 from an evaporator side through the adsorption target medium inflow pipe 36. Water vapor distributed to the adsorption target medium passage 25 penetrates into the adsorption agent packed bed. In the desorption, water vapor is discharged from the adsorption agent packed bed, and discharged water vapor is guided to a condenser side from the adsorption target medium outflow pipe 37 through each adsorption target medium passage 25.

The seats 32, 33 are provided with through-holes 32a, 33a, and the heat medium tube 21 can pass through the through-holes 32a, 33a. The through-holes 32a, 33a and the heat medium tube 21 are fixed gas-tightly by being coupled by a method such as brazing.

The tanks 34, 35 are provided with a heat medium inflow pipe 38 and a heat medium outflow pipe 39 that are capable of guiding heat medium. The heat medium flows into the heat medium inflow pipe 38 of a lower tank 34 and flows out from the heat medium outflow pipe 39 of an upper tank 35 through the heat medium tube 21. The lower tank 34 and the upper tank 35 are tanks to distribute and supply a heat exchange medium to the heat medium tubes 21.

A manufacturing method of the adsorption device 1 of the present embodiment will be described hereafter. First, coating in which an outer surface of the core member 21a made of stainless and having a cylindrical shape is coated by copper plating is handled. As a result, the heating medium tube 21 that has the covering layer 21b made of copper on the outer surface of the core member 21a is provided.

Subsequently, sintering in which the copper powder 23b and the adsorption agent 24 are sintered in the peripheral portion 22 of the heat medium tube 21 is handled. Specifically, the inside of the housing 3 is filled with the copper powder 23b and the adsorption agent 24 after the heat medium tube 21 is retained and fixed in the housing 3. Then, all components of the adsorption device 1 that are required to be coupled by brazing (i.e., brazing junction) are assembled, and the assembled body is sent in a furnace. Accordingly, a brazing coupling (i.e., the brazing junction) between components configuring the adsorption device 1, the sintering of the copper powder 23b filling the housing 3, a sintering coupling (i.e., a sintering junction) between the sintered copper powder 23b and the heat medium tube 21 (specifically, the covering layer 21b), and fixing the adsorption agent 24 into the sintered body (i.e., the porous heat transfer agent 23) are handled.

As described above, the stiffness of the heat medium tube 21 can be improved by configuring the core member 21a of the heat medium tube 21 by stainless that is a metal having higher hardness with respect to copper.

Furthermore, the heat transfer performance between the heat medium tube 21 and the adsorption agent 24 can be improved since the copper powder 23b having high thermal conductivity is used as a heat transfer agent between the heat medium tube 21 and the adsorption agent 24, by providing a sintered mixture of the copper powder 23b and the adsorption agent 24 in the peripheral portion 22 of the heat medium tube 21.

In addition, the copper powder 23b can be metallically coupled with the covering layer 21b by providing the covering layer 21b made of copper on the outer surface of the core member 21a of the heat medium tube 21 and by metallically coupling the copper powder 23b and the heat medium tube 21. Accordingly, thermal resistance of an interface between the sintered mixture (i.e., the porous heat transfer agent 23) and the heat medium tube 21 can be reduced dramatically, and the heat transfer performance between the heat transfer tube 21 and the adsorption agent 24 can be improved certainly.

As described above, stiffness of the heat medium tube 21 can be higher while improving the heat transfer performance between the heat medium tube 21 and the adsorption agent 24.

A thickness of the heat medium tube 21 is generally designed to be 0.6-1 mm in consideration of corrosion resistance when tap water is used as the heat medium in a conventional adsorption core 2 in which the heat medium tube 21 is made of copper. However, a high coefficient of performance (COP) cannot be exerted as a whole of the refrigeration cycle of the adsorption-type refrigerator since a thermal capacity increases when the thickness of the heat medium tube 21 increases.

In contrast, according to the present embodiment, the thickness of the heat medium tube 21 can be decreased, and the thermal capacity can be reduced, since the core member 21a of the heat medium tube 21 is made of stainless that is a metal having higher hardness with respect to copper. Accordingly, the coefficient of performance (COP) can be improved as a whole of the refrigeration cycle of the adsorption-type refrigerator.

Here, erosion and corrosion may be caused in the conventional adsorption core 2 in which the heat medium tube 21 is made of copper when a flow speed of the heat medium flowing in the heat medium tube 21 is high, since copper is a soft metal.

In contrast, according to the present embodiment, an occurrence of erosion and corrosion can be suppressed since the core member 21a of the heat medium tube 21 is made of stainless that is a metal having higher hardness with respect to copper.

The porous heat transfer agent 23 is required to have pores 23a in which water vapor as the adsorption target fluid flows as described above. Accordingly, the porous heat transfer agent 23 is required to be formed in a condition of retaining an extremely high porosity. To form the porous heat transfer agent 23 having the extremely high porosity, it is required not to apply a pressure from a circumference in the sintering. However, in a case where the heat medium tube 21 is made of metal other than copper, a junctionability between the porous heat transfer agent 23 (i.e., the copper powder 23b) and the heat medium tube 21 may deteriorate in a case where a pressure is not applied to the porous heat transfer agent from the circumference in the sintering.

In contrast, the covering layer 21b made of copper and the copper powder 23b can be metallically coupled successfully by providing the covering layer 21b made of copper on the outer surface of the heat medium tube 21 as the present embodiment. Therefore, the junctionability between the porous heat transfer agent 23 and the heat medium tube 21 can be improved even when metal other than copper is used to make the core member 21a of the heat medium tube 21.

Second Embodiment

Figure 7:
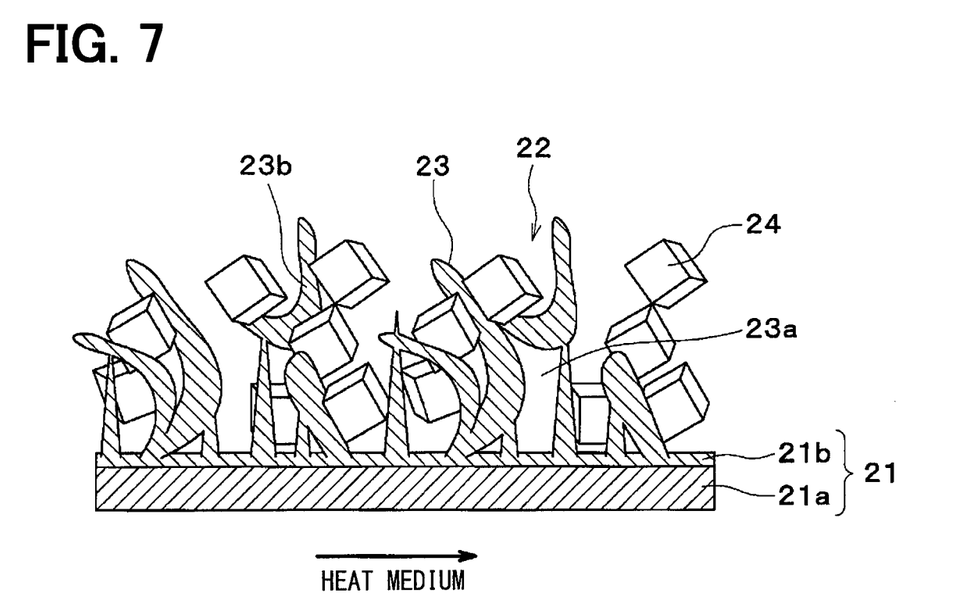
FIG. 7 is an enlarged view illustrating an adsorption core of a second embodiment.

A second embodiment of the present disclosure will be described hereafter referring to FIG. 7. As shown in FIG. 7, according to the second embodiment, the outer surface of the covering layer 21b of the heat medium tube 21 is roughened.

That is, roughing in which the outer surface of the covering layer 21*b* is roughed (i.e., formed to have an asperity) is treated.

As a specific roughing, a roughing process in which the outer surface of the covering layer 21*b* of the heat medium tube 21 is roughened after the coating and before the sintering is handled. As a method to rough the outer surface of the covering layer 21*b* of the heat medium tube 21, a method such as grinding by a file or the like, shot blast, etching, or dusting the outer surface of the covering layer with copper powder may be employed.

A contact area between the covering layer 21*b* and the copper powder 23*b* (i.e., the porous heat transfer agent 23) can be increased by treating the roughing on the outer surface of the covering layer 21*b* of the heat medium tube 21 as the present embodiment. Therefore, the heat exchange performance between the heat medium tube 21 and the porous heat transfer agent 23 can be improved.

OTHER MODIFICATIONS

It should be understood that the present disclosure is not limited to the above-described embodiments and intended to cover various modification within a scope of the present disclosure as described hereafter.

(1) In the above-described embodiments, an example in which the core member 21*a* of the heat medium tube 21 is made of stainless is described. However, the core member 21*a* may be made of another metal such as titanium as required as long as the metal has greater hardness with respect to copper.

(2) In the above-described embodiments, an example in which the heat medium tube 21 and the housing 3 has the cylindrical shape in cross section taken along a radial direction. However, the heat medium tube and the housing may have any shape such as an ellipse shape or a rectangular shape in the cross section taken along the radial direction.

What is claimed is:

1. A manufacturing method of an adsorption core that has (i) a heat medium tube in which a heat medium flows and (ii) an adsorption agent, outside of the heat medium tube, that adsorbs a fluid in a vapor phase when being cooled by the heat medium and desorbs the absorbed fluid when being heated, the manufacturing method of the adsorption core comprising:

plating a whole of an outer surface of a core member of the heat medium tube with copper to form a covering layer that is made of copper and that entirely covers the outer surface, the core member being made of metal having a higher hardness with respect to copper; and sintering a mixture of the adsorption agent and a copper powder to form a sintered body after plating the whole of the outer surface of the core member of the heat medium tube with copper, wherein the copper powder and the covering layer are metallically coupled with each other in the sintering.

2. The manufacturing method of the adsorption core according to claim 1, further comprising roughing an outer surface of the covering layer after the coating and before the sintering.

3. The manufacturing method of the adsorption core according to claim 1, wherein sintering the copper powder and the adsorption agent forms the sintered body extending from the covering layer in a direction intersecting with a flow direction of the heat medium.

* * * * *